(No Model.)
J. F. ALLISON.
CHURN.
No. 498,499. Patented May 30, 1893.
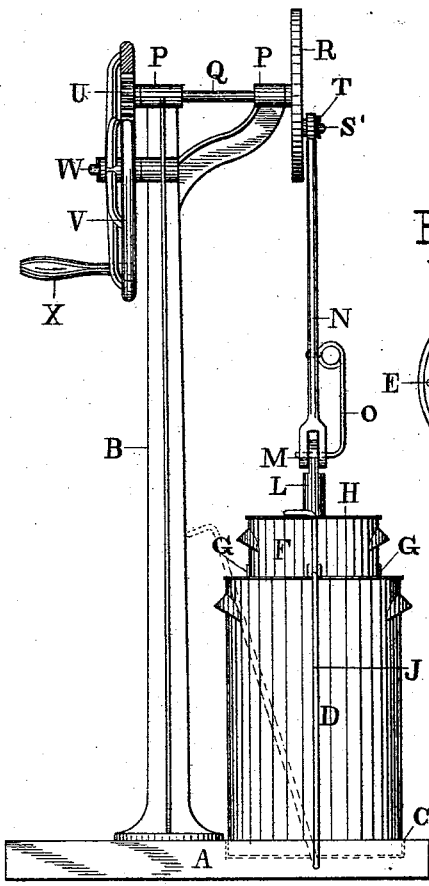
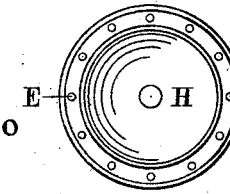
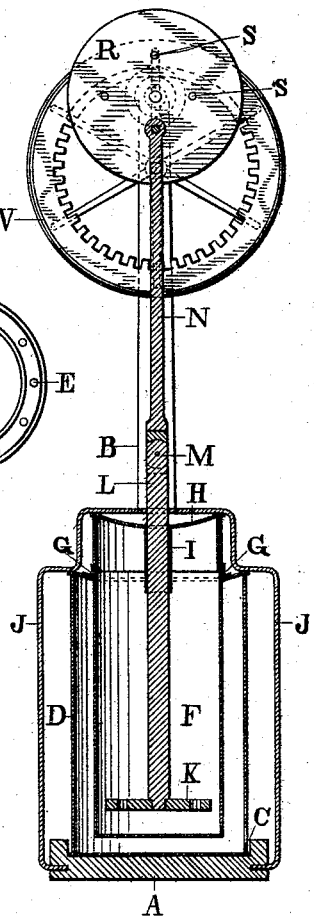
Witnesses
H. Alber
M. Dumm
Inventor
James F. Allison
By his Attorney P. Byrne

UNITED STATES PATENT OFFICE.

JAMES F. ALLISON, OF TRINITY, ASSIGNOR OF ONE-HALF TO VIRGIL OCTAVIUS HAWKINS, OF DECATUR, ALABAMA.

CHURN.

SPECIFICATION forming part of Letters Patent No. 498,499, dated May 30, 1893.

Application filed March 25, 1892. Serial No. 426,392. (No model.)

*To all whom it may concern:*

Be it known that I, JAMES F. ALLISON, a citizen of the United States, residing at Trinity Station, in the county of Morgan and State of Alabama, have invented certain new and useful Improvements in Churns; and I do hereby declare the following to be a full, clear, and exact description of the invention, such as will enable others skilled in the art to which it appertains to make and use the same.

My invention relates to improvements in churns, in which the dash has a vertical movement, and the objects of my improvements are to provide a simple and cheaply constructed method to operate the dasher, and to also provide a means of securing the churn rigidly to the stand when in operation, and to make a churn so constructed that in regulating the temperature of the cream in the usual manner, with hot or cold water, it will not be necessary to pour the water into the cream, and to make the parts of the churn so constructed as to be easily and conveniently reached to examine the cream, and for the removal of the butter when churned. I attain these objects by the mechanism illustrated in the accompanying drawings, in which—

Figure 1 is a vertical side view of the churn and the operating mechanism. Fig. 2 is a section taken at right angles to Fig. 1. Fig. 3 is a plan view of the top of the churn.

Similar letters refer to similar parts throughout the several views.

A represents the base which is made of wood or any suitable material, to which is secured the standard B, preferably of iron, with a flanged base, and securely fastened to the base A by screws or bolts; the base A is provided with a recess C into which the outer shell D of the churn rests, said outer shell being made of any suitable material of plain cylindrical shape, with a rim or part cover extending inwardly and inclined downwardly from the upper edge; this rim or part cover is provided with a number of holes E E at equal distances round its circumference. The inner shell or churn proper, F, is inserted in the outer shell and fits to the inner extending rim of the outer shell, and is suspended by the lugs G G resting on the top rim, and prevents the churn from resting on its bottom; the churn is provided with a cover H, with downwardly extending sides fitting on the inside of the churn, and has also a downwardly extending tube I fitted in the center, to form a guide for the stem of the dasher to freely work in.

The base A is provided with a metallic bail or stirrup pivoted in the base, and bent in the form shown in the drawings, that when drawn over the churn, part of it rests on the rim of the outer shell and part of it rests on the rim of the cover to the churn, and secures all firmly to the base A, and when pushed back as shown by the dotted lines, allows the removal of the cover H to examine the cream, and also allows the removal of the churn and outer shell from the base.

K is a dasher made of any suitable material in the usual manner, and L is the dasher stem having formed on its upper end a tenon M pivoted to the forked end of the pitman N; on the pitman N is secured a metallic wire O coiled in the form of a spring, with one or more coils, and bent downwardly, and then bent at right angles to form a pin or pivot to connect the dasher stem and the pitman together, and can be easily withdrawn to allow the churn and dash to be removed and inserted again to connect them when required.

On the top of the vertical standard B are the shaft bearings P P in which the shaft Q revolves freely; on one end of the shaft is secured the disk R, provided with the wrist-pin holes S S at unequal distances from the center, to change the stroke of the pitman N; in one of these holes is secured the wrist-pin S' to which is secured the pitman N at its upper end and held in place by the washer and pin T; on the other end of the shaft Q is secured a pinion U, geared into an internally geared wheel V and pivoted on the stud W inserted in the vertical standard B, the said gear-wheel having a handle X secured to its outer rim.

The operation of the churn is performed by turning the handle X, which puts in motion the gear-wheel V, and it acting by means of its internal gearing on the pinion U, puts in motion the shaft Q and the disk on its outer end, the said disk being connected by the wrist-pin S' to the pitman N pivoted on its other end to the dasher stem L, puts the dasher K in motion in the cream, and thus secures the proper agitation in the cream to quickly convert it into butter; if necessary to use hot or cold water to bring the cream to the proper temperature, it is poured on the rim of the outer shell and passes down through the holes E E on the outside of the churn.

Having thus described my invention, what I claim, and desire to secure by Letters Patent, is—

The churn described and shown consisting essentially of an inner cream vessel, an outer vessel surrounding the same and forming a water jacket therefor, said outer vessel having at its upper end, an inwardly projecting flange, lugs G secured to the outer side of the inner vessel and adapted to rest upon the flange, whereby the inner vessel is supported, a cover H for the latter, having an inwardly projecting tube which serves as a guide for the reciprocation churn dasher, a recessed base, the churn body seated therein, a bail pivoted at its lower end to the said base and adapted to rest at its upper end upon the upper end of the outer vessel and upon the cover of the inner vessel, whereby the vessels are held upon the base, a standard rising from the said base, provided with means for operating the dasher stem, all combined as set forth.

In testimony whereof I affix my signature in presence of two witnesses.

JAMES F. ALLISON.

Witnesses:
ANDY JOHNSON,
W. S. HICKS.